United States Patent
Kim et al.

(10) Patent No.: US 11,114,656 B2
(45) Date of Patent: Sep. 7, 2021

(54) ANODE, LITHIUM BATTERY INCLUDING ANODE, AND METHOD OF PREPARING ANODE

(71) Applicants: Samsung Electronics Co., Ltd., Suwon-si (KR); Samsung SDI Co., Ltd., Yongin-si (KR)

(72) Inventors: Youngeal Kim, Hwaseong-si (KR); Ryounghee Kim, Uiwang-si (KR); Seokgwang Doo, Seoul (KR); Satoshi Maruyama, Hwaseong-si (KR); Toshinori Sugimoto, Hwaseong-si (KR); Dongmin Im, Seoul (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 131 days.

(21) Appl. No.: 16/145,925

(22) Filed: Sep. 28, 2018

(65) Prior Publication Data
US 2019/0198865 A1    Jun. 27, 2019

(30) Foreign Application Priority Data
Dec. 27, 2017 (KR) .................. 10-2017-0181432

(51) Int. Cl.
*H01M 4/36* (2006.01)
*H01M 4/485* (2010.01)
(Continued)

(52) U.S. Cl.
CPC .......... *H01M 4/366* (2013.01); *H01M 4/485* (2013.01); *H01M 4/628* (2013.01);
(Continued)

(58) Field of Classification Search
CPC .... H01M 4/366; H01M 10/052; H01M 4/485; H01M 10/0525; H01M 4/628; H01M 2004/021; H01M 2004/027
See application file for complete search history.

(56) References Cited

U.S. PATENT DOCUMENTS 6,761,744 B1 *  7/2004  Tsukamoto ......... H01M 4/0435
                                                              29/623.3
6,890,685 B2    5/2005  Yamamoto et al.
(Continued)

FOREIGN PATENT DOCUMENTS

JP   2010272357 A   12/2010
KR   100449765 B1   9/2004
(Continued)

OTHER PUBLICATIONS

Kozen et al. "Next-Generation Lithium Metal Anode Engineering via Atomic Layer Deposition." ACS Nano, vol. 9, No. 6, 5884-5492 (2015) (Year: 2015).*
(Continued)

*Primary Examiner* — Michael L Dignan
(74) *Attorney, Agent, or Firm* — Cantor Colburn LLP

(57) ABSTRACT

An anode, a lithium battery including the anode, and a method of preparing the anode. The anode includes a current collector; a first anode layer disposed on the current collector; a second anode layer disposed on the first anode layer; and an inorganic protection layer disposed on the second anode layer, wherein an oxidation/reduction potential of the first anode layer and an oxidation/reduction potential of the second anode layer are different from each other.

15 Claims, 4 Drawing Sheets

(51) Int. Cl.
  *H01M 10/0525* (2010.01)
  *H01M 4/62* (2006.01)
  *H01M 10/052* (2010.01)
  *H01M 4/02* (2006.01)

(52) U.S. Cl.
  CPC ..... *H01M 10/052* (2013.01); *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 6,936,381 | B2 | 8/2005 | Skotheim et al. | |
| 7,582,387 | B2* | 9/2009 | Howard | H01M 4/131 |
| | | | | 429/218.1 |
| 7,588,623 | B2* | 9/2009 | Dover | H01M 4/366 |
| | | | | 75/332 |
| 7,914,930 | B2* | 3/2011 | Sato | H01M 10/0525 |
| | | | | 429/231.95 |
| 9,166,222 | B2* | 10/2015 | Amiruddin | H01M 10/052 |
| 2004/0072066 | A1 | 4/2004 | Cho et al. | |
| 2005/0130043 | A1* | 6/2005 | Gao | H01M 4/0435 |
| | | | | 429/231.95 |
| 2012/0045670 | A1* | 2/2012 | Stefan | H01M 4/386 |
| | | | | 429/61 |
| 2015/0086880 | A1 | 3/2015 | Ann et al. | |
| 2016/0181594 | A1* | 6/2016 | Balogh | H01M 4/139 |
| | | | | 156/247 |
| 2016/0351973 | A1 | 12/2016 | Albano | |
| 2017/0279163 | A1 | 9/2017 | Jang et al. | |

FOREIGN PATENT DOCUMENTS

| KR | 100866863 B1 | 10/2008 |
|---|---|---|
| KR | 101028657 B1 | 4/2011 |
| KR | 1020140137660 A | 12/2014 |
| KR | 101634749 B1 | 6/2016 |
| KR | 101751601 B1 | 6/2017 |

OTHER PUBLICATIONS

Chen et al. "Lithium metal protected by atomic layer deposition metal oxide for high performance anodes." J. Mater. Chem. A, 2017, 5, 12297 (Year: 2017).*
Aldon et al. "Chemical and Electrochemical Li-insertion into the Li4Ti5O12 Spinel." Chem. Mater., 2004, 16, 5721-5725 (Year: 2004).*
Liang et al. "Composite lithium metal anode by melt infusion of lithium into a 3D conducting scaffold with lithiophilic coating." PNAS, vol. 113, No. 11, Mar. 2016, 2862-2867. (Year: 2016).*
Fan et al. "Regulating Li Deposition at Artificial Solid Electrolyte Interphases." J. Mater. Chem. A., 2017, 5, 3483 (Year: 2017).*
Delaporte et al. "Pre-treatments of Lithium Foil Surface for Improving the Cycling Life of Li Metal Batteries." Frontiers in Materials, Nov. 2019, vol. 6, Article 267, doi: 10.3389/fmats.2019.00267 (Year: 2019).*
Jung, et al. "Ultrathin Direct Atomic Layer Deposition on Composite Electrodes for Highly Durable and Safe Li-Ion Batteries." Adv. Mater. 2010, 22, 2172-2176 (Year: 2010).*
Choi et al., "Li-ion batteries from LiFePO4 cathode and anatase/graphene composite anode for stationary energy storage", Electrochemistry Communications, 12, 2010, pp. 378-381.
Choi et al., "Low Cost, Long Cycle Life, Li-ion Batteries for Stationary Applications", Pacific Northwest National Laboratory, 2010, p. 1-14.
Tsai et al., Conductivity Enhancement and Thin-Film Processing of Li4Ti5O12(LTO) Spinel for Li Battery Applications, The Electrochemical Society, 68(2), 2015, pp. 37-43.
Viswanathan et al., "Effect of entropy change of lithium intercalation in cathodes and anodes on Li-ion battery thermal management", Journal of Power Sources, 195, 2010, pp. 3720-3729.

* cited by examiner

ANODE, LITHIUM BATTERY INCLUDING ANODE, AND METHOD OF PREPARING ANODE

CROSS-REFERENCE TO RELATED APPLICATION

This application claims priority to and the benefit of Korean Patent Application No. 10-2017-0181432, filed on Dec. 27, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to an anode, a lithium battery including the anode, and a method of preparing the anode.

2. Description of the Related Art

Lithium secondary batteries have excellent charge/discharge efficiency and capacity, have no memory effect, and have a low degree of self-discharge. Thus, since their commercialization, lithium secondary batteries have been used as core components of portable electronic devices. In recent years, the use of lithium secondary batteries has expanded from devices using a small-to-medium size battery, such as vacuum machines or power tools, to devices using a medium-to-large size battery, such as electric vehicles, energy storage devices, and various robots.

A lithium secondary battery using a carbon-based anode material may have a relatively low energy density and a low discharge capacity. In this regard, attempts have been made to improve the energy density and the capacity of anodes for lithium secondary batteries.

In a lithium secondary battery, when lithium metal is used as an anode, an energy density per unit weight and an energy density per unit volume of the lithium secondary battery may increase to three (3) times that of comparative batteries due to the low density and low oxidation/reduction potential (−3.045 volts (V) versus (vs.) standard hydrogen electrode ("SHE")) of lithium. Nonetheless, there remains a need for a lithium secondary battery having improved lifespan.

SUMMARY

Provided is an anode including a plurality of anode layers.
Provided is a lithium battery having improved lifespan characteristics by including the anode.
Provided is a method of preparing the anode.
Additional aspects will be set forth in part in the description which follows and, in part, will be apparent from the description, or may be learned by practice of the presented embodiments.

According to an aspect of an embodiment, an anode includes a current collector; a first anode layer disposed on the current collector; a second anode layer disposed on the first anode layer; and an inorganic protection layer disposed on the second anode layer, wherein an oxidation/reduction potential of the first anode layer and an oxidation/reduction potential of the second anode layer are different from each other.

According to an aspect of an embodiment, a lithium battery includes a cathode; the anode; and an electrolyte disposed between the cathode and the anode.

According to an aspect of an embodiment, a method of preparing an anode includes disposing a first anode layer on a current collector; disposing, on the first anode layer, a second anode layer having an oxidation/reduction potential different from that of the first anode layer; and disposing an inorganic protection layer on the second anode layer, wherein the inorganic protection layer is disposed by atomic layer deposition ("ALD") to a thickness of 100 nanometers (nm) or less.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
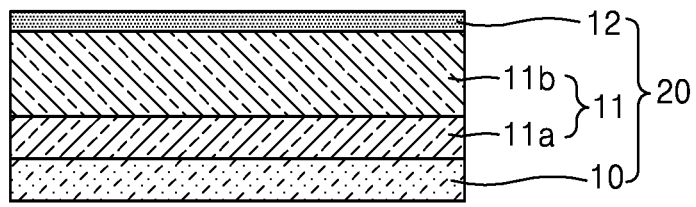
FIG. 1 is a schematic cross-sectional view of an embodiment of an anode including a plurality of anode layers.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, as the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept.

The terms used herein are merely used to describe particular embodiments, and are not intended to limit the present inventive concept. An expression used in the singular encompasses the expression of the plural, unless it has a clearly different meaning in the context. As used herein, it is to be understood that the terms such as "including," "having," and "comprising" are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. The symbol "/" used herein may be interpreted as "and" or "or" according to the context.

In the drawings, the diameters, lengths, and thicknesses of layers and regions are exaggerated or reduced for clarity. Like reference numerals in the drawings denote like elements, and thus their description will be omitted. Throughout the specification, it will be understood that when a component, such as a layer, a film, a region, or a plate, is referred to as being "on" another component, the component can be directly on the other component or intervening components may be present thereon. Throughout the specification, while such terms as "first," "second," etc., may be used to describe various components, such components must not be limited to the above terms. The above terms are used only to distinguish one component from another. Some of components may not be shown in the drawings for the better understanding of features of the inventive concept but not intended to omit the components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

Since the lithium metal used as an anode in a lithium secondary battery may be completely consumed after a relatively long period of a charge/discharge process, e.g., repeated charging and discharging, due to electrochemical deposition/stripping reactions of the lithium metal, the lifespan of the lithium secondary battery is limited. Provided is a method of improving the lifespan of a lithium secondary battery.

Hereinafter, according to example embodiments, an anode, a lithium battery including the anode, and a method of preparing the anode will be described.

According to an embodiment, an anode includes a current collector; a first anode layer disposed on the current collector; a second anode layer disposed on the first anode layer; and an inorganic protection layer disposed on the second anode layer, wherein the first anode layer and the second anode layer have oxidation/reduction potentials that are different from each other.

Since the anode includes a plurality of anode layers, the first anode layer may remain after the second anode layer being completely consumed by a long period of a charge/discharge process. Accordingly, lifespan characteristics of a lithium battery including an anode including a plurality of anode layers may improve.

Referring to FIG. 1, an anode 20 includes a current collector 10; a first anode layer 11a disposed on the current collector 10; a second anode layer 11b disposed on the first anode layer 11a; and an inorganic protection layer 12 disposed on the second anode layer 11b. An anode layer 11 includes the first anode layer 11a and the second anode layer 11b.

The first anode layer 11a may have an oxidation/reduction potential that is greater than that of the second anode layer 11b. The oxidation/reduction potential of the first anode layer 11a may be 0.1 V or greater, 0.3 V or greater, 0.5 V or greater, 0.7 V or greater, 1.0 V or greater, 1.3 V or greater, or 1.5 V or greater with respect to lithium metal.

The first anode layer 11a may be a non-consumable anode layer. A thickness of the first anode layer 11a is independent to the number of charging/discharging cycles. That is, since the first anode layer 11a is not consumed even when the number of charging/discharging cycles increases, the thickness of the first anode layer 11a may be substantially maintained the same. A structural and/or morphological change of the first anode layer 11a is substantially insignificant besides intercalation/deintercalation of lithium during a charging/discharging process, and thus a structure, a volume, and a thickness of the initial anode layer 11 are substantially maintained the same after a long period of a charge/discharge process. In other words, the first anode layer 11a may be a permanent anode layer.

The first anode layer 11a may include an anode active material of a lithium transition metal oxide, a transition metal oxide, a non-transition metal oxide, or a combination thereof. When the first anode layer 11a includes the anode active material, lifespan characteristics of a lithium battery may improve.

For example, the first anode layer 11a may include a lithium titanium oxide represented by one of Formulae 1 to 3, a lithium iron oxide represented by Formula 4, a lithium tungsten oxide represented by Formula 5, a lithium vanadium oxide represented by Formula 6, a vanadium oxide represented by Formula 7, a titanium oxide represented by Formula 8, a silicon oxide represented by Formula 9, a tin oxide represented by one of Formulae 10 and 11, a lead oxide represented by Formula 12, an antimony oxide represented by Formula 13, a bismuth oxide represented by Formula 14, a gold oxide represented by Formula 15, a silver oxide represented by Formula 16, a zinc oxide represented by Formula 17, a platinum oxide represented by Formula 18, a carbon oxide represented by Formula 19, or a combination thereof:

$$Li_{4+a}Ti_{5-b}M_cO_{12-d} \quad \text{Formula 1}$$

In Formula 1, −0.2≤a≤0.2, −0.3≤b≤0.3, 0≤c≤0.3, and −0.3≤d≤0.3; and M may be at least one metal of Group 1 to 6, 8, and 12 to 15.

For example, in Formula 1, M may be lithium (Li), calcium (Ca), strontium (Sr), chromium (Cr), vanadium (V), iron (Fe), zirconium (Zr), zinc (Zn), silicon (Si), yttrium (Y), niobium (Nb), gallium (Ga), molybdenum (Mo), tungsten (W), barium (Ba), lanthanum (La), cerium (Ce), tantalum (Ta), hafnium (Hf), ruthenium (Ru), antimony (Sb), arsenic (As), or a combination thereof.

$$Li_{1+a}Ti_{1-b}O_{3-d} \quad \text{Formula 2}$$

In Formula 2, $-0.2 \le a \le 0.2$, $-0.3 \le b \le 0.3$, and $-0.3 \le d \le 0.3$ $$Li_{2+a}Ti_{3-b}O_{7-d} \quad \text{Formula 3}$$

In Formula 3, $-0.2 \le a \le 0.2$, $-0.3 \le b \le 0.3$, and $-0.3 \le d \le 0.3$.

$$Li_xFe_2O_3 \quad \text{Formula 4}$$

In Formula 4, $0 \le x \le 1$.

$$Li_xWO_2 \quad \text{Formula 5}$$

In Formula 5, $0 \le x \le 1$.

$$Li_xV_yO_2 \quad \text{Formula 6}$$

In Formula 6, $0 \le x \le 1.2$ and $0 < y \le 1$.

$$V_xO_y \quad \text{Formula 7}$$

In Formula 7, $0 < x \le 3$ and $0 < y \le 7$.

$$Ti_xO_y \quad \text{Formula 8}$$

In Formula 8, $0 < x \le 1.2$ and $0 < y \le 2.2$.

$$SiO_x \quad \text{Formula 9}$$

In Formula 9, $0 < x \le 2$.

$$Sn_xMe_{1-x}Me'_yO_z \quad \text{Formula 10}$$

In Formula 10, Me is Mn, Fe, Pb, or Ge; Me' is Al, B, P, Si, Group 1, 2, and 3 elements, or a halogen; and $0 \le x \le 1$, $1 \le y \le 3$, and $1 \le z \le 8$.

$$SnO_x \quad \text{Formula 11}$$

In Formula 11, $0 < x \le 2$.

$$PbO_x \quad \text{Formula 12}$$

In Formula 12, $0 < x \le 2$.

$$SbO_y \quad \text{Formula 13}$$

In Formula 13, $0 < y \le 2$.

$$Bi_xO_y \quad \text{Formula 14}$$

In Formula 14, $0 < x \le 3$ and $0 < y \le 7$.

$$Au_xO_y \quad \text{Formula 15}$$

In Formula 15, $0 < x \le 1$ and $0 < y \le 1$.

$$Ag_xO_y \quad \text{Formula 16}$$

In Formula 16, $0 < x \le 1$ and $0 < y \le 1$.

$$Zn_xO_y \quad \text{Formula 17}$$

In Formula 17, $0 < x \le 1$ and $0 < y \le 1$.

$$Pt_xO_y \quad \text{Formula 18}$$

In Formula 18, $0 < x \le 1$ and $0 < y \le 1$.

$$C_xO_y \quad \text{Formula 19}$$

In Formula 19, $0 < x \le 1$ and $0 < y \le 1$.

For example, the first anode layer 11a may include AuO, AgO, ZnO, PtO, SbO, SiO, or CO.

For example, the first anode layer 11a may include a compound having a spinel crystal structure. The spinel crystal structure is structurally stable, and thus the structure may not substantially change despite repeated intercalation/deintercalation of lithium. Thus, the compound having a spinel crystal structure may substantially maintain an initial crystal structure even after a long period of a charge/discharge process. In some embodiments, the first anode layer 11a including a compound having a spinel crystal structure may suppress volume expansion/contraction during a charge/discharge process. When the first anode layer 11a suppresses volume expansion/contraction during a charge/discharge process, detachment of the first anode layer 11a and the current collector 10 may be suppressed, and lifespan characteristics of a lithium battery including the anode 20 including the first anode layer 11a may improve.

For example, the first anode layer 11a may include a compound that belongs to the Fd$\bar{3}$m space group and having a spinel crystal structure. For example, the first anode layer 11a may include a lithium titanium oxide that has a spinel crystal structure and represented by Formula 1.

A thickness of the first anode layer 11a may be about 100 micrometers (μm) or less, about 50 μm or less, about 20 μm or less, about 10 μm or less, about 8 μm or less, about 5 μm or less, about 3 μm or less, about 2 μm or less, or about 1 μm or less. For example, the thickness of the first anode layer 11a may be in a range of about 10 nanometers (nm) to about 100 μm, about 10 nm to about 20 μm, about 10 nm to about 10 μm, about 20 nm to about 8 μm, about 30 nm to about 5 μm, about 50 nm to about 3 μm, about 100 nm to about 2 μm, or about 100 nm to about 1 μm. When the first anode layer 11a has a thickness of about 100 μm or less, detachment of the first anode layer 11a and the current collector 10 may be suppressed after a long period of a charge/discharge process, and lifespan characteristics of a lithium battery including the anode 20 including the first anode layer 11a may improve.

Referring to FIG. 1, the second anode layer 11b may be a consumable anode layer. A thickness of the second anode layer 11b is dependent to the number of charging/discharging cycles. That is, the second anode layer 11b is consumed as the number of charging/discharging cycles increases, and thus a thickness of the second anode layer 11b may continuously decrease. A significant structural and/or morphological change of the second anode layer 11b proceeds due to irreversible intercalation/deintercalation of lithium during a charging/discharging process, and thus a structure, a volume, and a thickness of the initial anode layer 11 may not be substantially maintained the same after a long period of a charge/discharge process. As a result, the second anode layer 11b may be substantially and completely consumed after a long period of a charge/discharge process.

The second anode layer 11b may include lithium metal or a lithium alloy. The lithium alloy may include a metal/semi-metal that is alloyable with lithium. Examples of the metal/semi-metal alloyable with lithium may include Si, Sn, Al, Ge, Pb, Bi, Sb, a Si—Y' alloy (where Y' is an alkali metal, an alkali earth metal, Group 13 to 16 elements, a transition metal, a rare earth element, or a combination thereof, and Y' is not Si), and a Sn—Y' alloy (where Y' is an alkali metal, an alkali earth metal, a Group 13 element, a Group 14 element, a transition metal, a rare earth element, or a combination thereof, and Y' is not Sn). In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

A density of the lithium metal or the lithium alloy in the second anode layer 11b may be about 0.5 grams per cubic centimeter (g/cm³) or less, about 0.45 g/cm³ or less, about 0.4 g/cm³ or less, about 0.35 g/cm³ or less, or about 0.3 g/cm³ or less. For example, the density of the lithium metal or the lithium alloy in the second anode layer 11b may be in a range of about 0.3 g/cm³ to about 0.5 g/cm³, about 0.3 g/cm³ to about 0.45 g/cm³, about 0.3 g/cm³ to about 0.4 g/cm³, or about 0.3 g/cm³ to about 0.35 g/cm³. When the lithium metal or the lithium alloy in the second anode layer 11b has a density within these ranges, lifespan characteristics of a lithium battery including the anode 20 including the second anode layer 11b may improve.

A thickness of the second anode layer 11b may be about 1,000 μm or less, about 500 μm or less, about 200 μm or less, about 100 μm or less, about 50 μm or less, about 20 μm or less, about 18 μm or less, about 15 μm or less, about 13 μm or less, about 12 μm or less, or about 10 μm or less. For example, the thickness of the second anode layer 11b may be in a range of about 1 μm to about 1,000 μm, about 1 μm to about 500 μm, about 1 μm to about 200 μm, about 1 μm to about 100 μm, about 1 μm to about 50 μm, about 1 μm to about 20 μm, about 2 μm to about 18 μm, about 3 μm to about 15 μm, about 4 μm to about 13 μm, about 5 μm to about 12 μm, or about 5 μm to about 10 μm. When the second anode layer 11b has a thickness of about 1,000 μm or less, excessive thickness change of the second anode layer 11b may be suppressed, and detachment of the second anode layer 11b and the first anode layer 11b may be suppressed. In this regard, lifespan characteristics of a lithium battery including the anode 20 including the second anode layer 11b may improve.

Referring to FIG. 1, the inorganic protection layer 12 is substantially a pin-hole-free layer. Since the inorganic protection layer 12 does not include defects such as a pin-hole, an electrolyte solution cannot contact the second anode layer 11b through the inorganic protection layer 12 even after a long period of a charge/discharge process. As a result, a side reaction between the second anode layer 11b and the electrolyte solution may be suppressed due to the inorganic protection layer 12 after a long period of a charge/discharge process. In a protection layer having a lot of pin-holes, an electrolyte solution including a solvent may relatively easily contact lithium metal through the pin-holes. Thus, the electrolyte solution may react with the lithium metal and grow lithium dendrites irregularly. The lithium dendrites having irregular shapes may cause cracks of, e.g., in, the protection layer and detachment between the protection layer and the lithium metal, e.g., detachment of the protection layer from the lithium metal, which may result in deterioration of cycle characteristics of the lithium battery.

In some embodiments, the inorganic protection layer 12 is substantially a grain boundary-free layer. When the inorganic protection layer 12 is formed of a crystalline compound, the inorganic protection layer 12 substantially does not include a grain boundary, and thus impregnation of a solvent through a grain boundary may be suppressed. A grain boundary may function as a defect in a protection layer including a plurality of grains or crystallites and a grain boundary between the grains or crystallites. For example, when the grain boundary functions as a defect which is an electrolyte solution pathway, cracks of the protection layer including the grain boundary and detachment between the protection layer and the lithium metal may occur after a long period of a charge/discharge process, and cycle characteristics of the lithium battery may deteriorate.

As described above, the inorganic protection layer 12 does not include a pin-hole and/or a grain boundary, and thus the inorganic protection layer 12 is substantially a solvent-impermeable layer. Thus, since permeation of a solvent through the inorganic protection layer 12 even after a long period of a charge/discharge process is minimized or blocked, lithium metal may be reversibly charged/discharged, and thus, as a result, lifespan characteristics of a lithium battery including the anode 20 including the inorganic protection layer 12 may improve.

The inorganic protection layer 12 may include a compound of a metal oxide, a metal nitride, a metal nitrate, a metal carbide, a lithiated compound thereof, or a combination thereof or a ceramic electrolyte. The inorganic protection layer 12 may include a metal oxide of alumina ($Al_2O_3$), silica ($SiO_2$), titania ($TiO_2$), $HfO_2$, $SrTiO_3$, $SnO_2$, $CeO_2$, $Na_2O$, MgO, NiO, CaO, BaO, ZnO, $ZrO_2$, $Y_2O_3$, $BaTiO_3$, $Li_2O$, RaO, CaO, SrO, $Sc_2O_3$, $Ce_2O_3$, silsesquioxane having a cage structure, or a combination thereof; a metal nitride of ZrN, TaN, HfN, VN, NbN, $Cr_2N$, TaN, CrN, GeN, $TLi_3N$, $Mg_3N_2$, $Ca_3N_2$, $Sr_3N_2$, $Ba_3N_2$, BN, AlN, and TiN; a metal nitride selected from tantalum oxynitride (TaON), a zirconium oxynitride ($ZrO_xN_y$, where 0<x<2 and 0<y<3), lithium phosphorus oxynitride (LiPON), or a combination thereof; a metal carbide of TiC, ZrC, HfC, NbC, TaC, $Cr_3C_2$, $MnO_2C$, WC, SiC, or a combination thereof; a metal-organic framework ("MOF"); a lithiated compound of any of the above; or a ceramic conductor of $Li_{1+x+y}Al_xTi_{2-x}Si_yP_{3-y}O_{12}$ (where 0<x<2 and 0≤y<3), $BaTiO_3$, $Pb(Zr_xTi_{1-x})O_3$ wherein 0≤x<1 ("PZT"), $Pb_{1-x}La_xZr_{1-y}Ti_yO_3$ ("PLZT", where 0≤x<1 and 0≤y<1), $Pb(Mg_3Nb_{2/3})O_3$—$PbTiO_3$ ("PMN-PT"), lithium phosphate ($Li_3PO_4$), a lithium titanium phosphate ($Li_xTi_y(PO_4)_3$, where 0<x<2 and 0<y<3), a lithium aluminum titanium phosphate ($Li_xAl_yTi_z(PO_4)_3$, where 0<x<2, 0<y<1, and 0<z<3), $Li_{1+x+y}(Al_aGa_{1-a})_x(Ti_bGe_{1-b})_{2-x}Si_yP_{3-y}O_{12}$ (where 0≤x≤1, 0≤y≤1, 0≤a<1, and 0≤b<1), a lithium lanthanum titanate ($Li_xLa_yTiO_3$, where 0<x<2 and 0<y<3), a lithium germanium thiophosphate ($Li_xGe_yP_zS_w$, where 0<x<4, 0<y<1, 0<z<1, and 0<w<5), a lithium nitride ($Li_xN_y$, where 0<x<4 and 0<y<2), a silicon sulfur glass ($Li_xSi_yS_z$, where 0<x<3, 0<y<2, and 0<z<4), a phosphorus sulfur glass ($Li_xP_yS_z$, where 0<x<3, 0<y<3, and 0<z<7), a $Li_2O$—$Al_2O_3$—$SiO_2$—$P_2O_5$—$TiO_2$—$GeO_2$ ceramic, a Garnet ceramic ($Li_{3+x}La_3M_2O_{12}$, where 0≤x≤5, and M=Te, Nb, or Zr), or a combination thereof.

A lithium ion insulator among the metal oxide, metal nitride, metal nitrate, and metal carbide included in the inorganic protection layer 12 partially or entirely becomes a lithium ion conductor having lithium ion conductivity by lithiation during a formation process, i.e., initial charging/discharging process of lithium battery. Thus, the inorganic protection layer 12 and/or the lithiated inorganic protection layer 12 is disposed at an interface between an electrolyte and a lithium anode, instead of a comparative solid electrolyte interface ("SEI"). When a comparative SEI is used, a side reaction may occur during a charging/discharging process, detachment from the lithium metal may occur relatively easily, and growth of lithium dendrites may not be suppressed. Whereas, when the inorganic protection layer 12 and/or the lithiated inorganic protection layer 12 is used, a side reaction may be suppressed, detachment from the lithium metal may not occur relatively easily, and growth of lithium dendrites may be suppressed since the inorganic protection layer 12 and/or the lithiated inorganic protection layer 12 is substantially free of a pin-hole and/or a grain boundary. As a result, lifespan characteristics of a lithium battery including an anode having the inorganic protection layer 12 or the lithiated inorganic protection layer 12 may improve.

The ceramic conductor may be generally a lithium ion conductor.

A thickness of the inorganic protection layer 12 may be about 100 nm or less, about 60 nm or less, about 50 nm or less, about 40 nm or less, about 30 nm or less, about 20 nm or less, or about 10 nm or less. For example, the thickness of the inorganic protection layer 12 may be in a range of about 1 nm to about 100 nm, about 1 nm to about 60 nm, about 5 nm to about 50 nm, about 5 nm to about 40 nm, about 5 nm to about 30 nm, about 5 nm to about 20 nm, or about 5 nm to about 10 nm. When the inorganic protection layer 12 has a thickness of about 100 nm or less, detachment between the inorganic protection layer 12 and the second anode layer 11b may be suppressed even after a long period of a charge/discharge process, and lifespan characteristics of a lithium battery including the anode 20 including the inorganic protection layer 12 may improve.

The inorganic protection layer 12 is a flexible layer that is bendable. Due to its relatively thin thickness of about 100 nm or less, when the inorganic protection layer 12 has flexibility, the inorganic protection layer 12 may be bent or curved. Thus, as the inorganic protection layer 12 may compensate, e.g., fill, a volume of the second anode layer 11b during a charging/discharging process relatively easily, and detachment between the second anode layer 11b and the inorganic protection layer 12 may be suppressed even after a long period of a charge/discharge process.

Referring to FIG. 1, for example, the first anode layer 11a in the anode 20 is a lithium titanium oxide layer represented by Formula 1, the second anode layer 11b is a lithium metal layer, and the inorganic protection layer 12 is an alumina layer free of pin-hole.

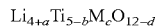

Formula 1

In Formula 1, −0.2≤a≤0.2, −0.3≤b≤0.3, 0≤c≤0.3, and −0.3≤d≤0.3; and M is at least one metal of Group 1 to 6, 8, and 12 to 15.

According to an embodiment, a lithium battery includes a cathode; the anode described above; and an electrolyte between the cathode and the anode.

Figure 2A:
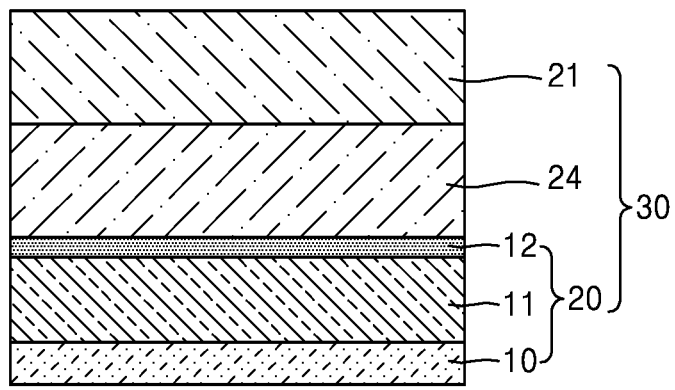
FIGS. 2A to 2H are schematic cross-sectional views of an embodiment of a lithium battery.

Referring to FIG. 2A, a lithium battery 30 includes a cathode 21; an anode 20; and an electrolyte 24 between the cathode 21 and the anode 20. The anode 20 includes a current collector 10; an anode layer 11; and an inorganic protection layer 12. Although not shown in FIG. 2A, the anode layer 11 includes a first anode layer and a second anode layer. When the lithium battery 30 includes the anode layer 11 including the first anode layer and the second anode layer; and the inorganic protection layer 12, the lithium battery 30 may operate by the second anode layer even after the first anode layer is completely consumed, and thus lifespan of the lithium battery 30 may improve. Also, since the inorganic protection layer 12 effectively minimizes or prevents a side reaction between the electrolyte 24 and lithium metal in the second anode layer, performance deterioration of the lithium battery 30 may be suppressed.

The electrolyte 24 of the lithium battery 30 may include a liquid electrolyte, a solid electrolyte, a gel electrolyte, a polymeric ionic liquid, or a combination thereof. The lithium battery 30 may further include a separator.

Figure 2B:
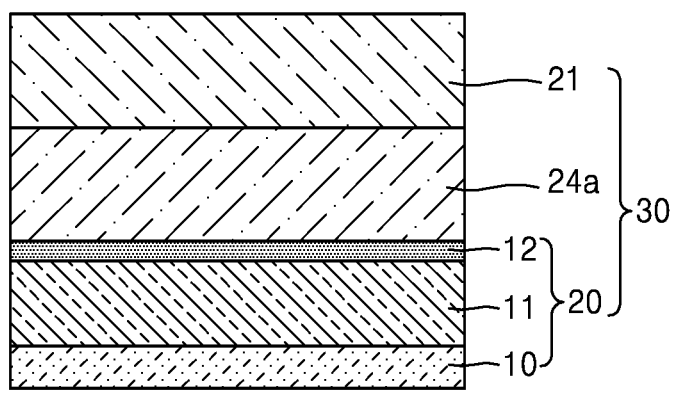
Figure 2C:
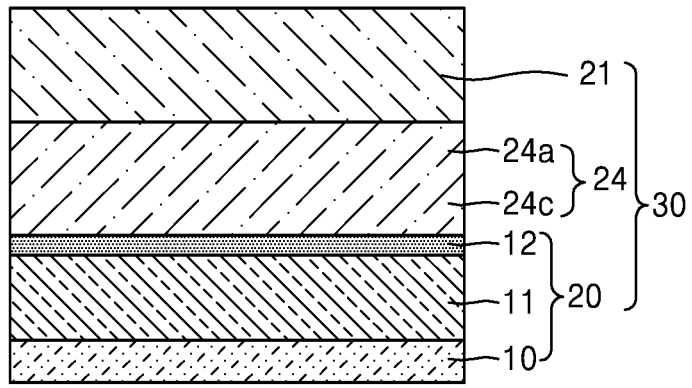
Figure 2D:
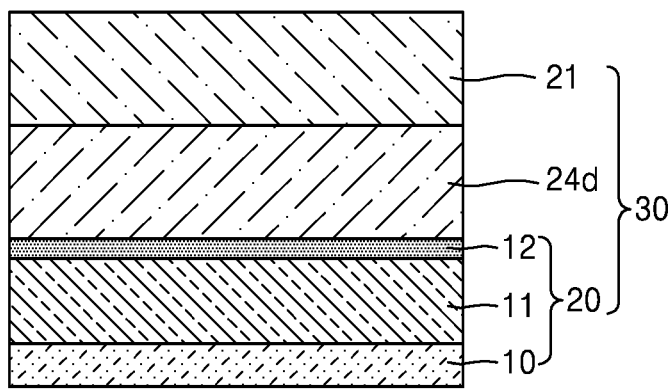

Referring to FIGS. 2B to 2D, the electrolyte 24 may have a single layer structure or a multi-layer structure according to an energy density, a current amount, or a lifespan of the lithium battery 30.

Referring to FIG. 2B, the electrolyte 24 may have a single layer structure including a first liquid electrolyte layer 24a that contacts the inorganic protection layer 12 of the anode 20 and contains a first liquid electrolyte.

Referring to FIG. 2C, the electrolyte 24 may have a single layer including both a separator 24c that contacts the inorganic protection layer 12 of the anode 20; and a first liquid electrolyte layer 24a that contains a first liquid electrolyte impregnated in the separator 24c. The separator 24c may include polyethylene, polypropylene, polyvinylidene fluoride, or a multi-layer of including two or more layers thereof. For example, the separator 24c may be a mixed multi-layer such as a 2-layer separator of polyethylene/polypropylene or a 3-layer separator of polypropylene/polyethylene/polypropylene. The separator 24c is not limited thereto, and any suitable separator that may be used to block a short circuit between the cathode 21 and the anode 20 in the art may be used as the separator 24c.

Referring to FIG. 2D, the electrolyte 24 may have a single layer structure including a first solid electrolyte layer 24d that contacts the inorganic protection layer 12 of the anode 20 and contains a polymer electrolyte.

Figure 2E:
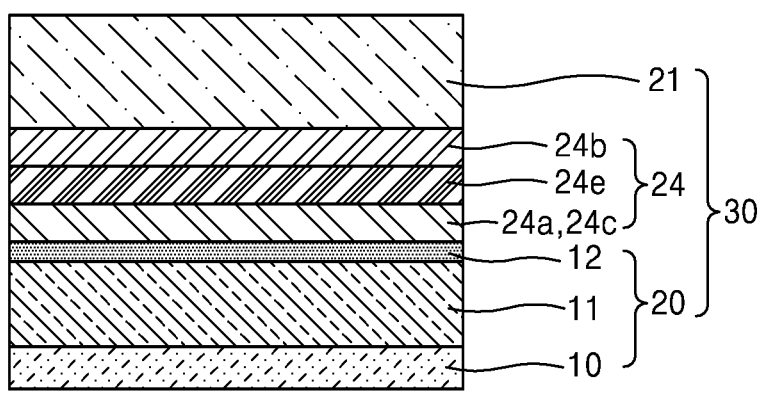

Referring to FIG. 2E, the electrolyte 24 may have a multi-layer structure including a separator 24c and a first liquid electrolyte layer 24a, wherein the separator 24c contacts the inorganic protection layer 12 of the anode 20, and the first liquid electrolyte layer 24a includes a first liquid electrolyte impregnated in the separator 24c; a second solid electrolyte layer 24e that contacts the first liquid electrolyte layer 24a and contains a ceramic conductor; and a second liquid electrolyte layer 24b that contacts the second solid electrolyte layer 24e and contains a second liquid electrolyte. The cathode 21 and the anode 20 are completely separated by the second solid electrolyte layer 24e, and the anode 20 and the second solid electrolyte layer 24e are completely separated by the first liquid electrolyte layer 24a, which suppresses a side reaction, and thus lifespan characteristics of the lithium battery 30 including an electrolyte having a multi-layer structure may significantly improve. In some embodiments, the first liquid electrolyte may be an anolyte, and the second liquid electrolyte may be a catholyte. Compositions of the first liquid electrolyte and the second liquid electrolyte may be identical to or different from each other.

Figure 2F:
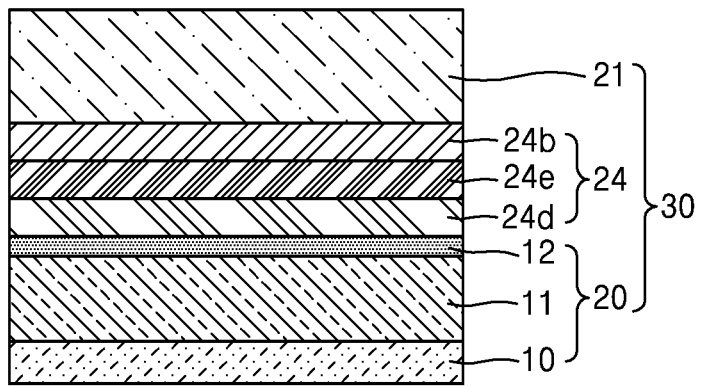

Referring to FIG. 2F, the electrolyte 24 may have a multi-layer including a first solid electrolyte layer 24d that contacts the inorganic protection layer 12 of the anode 20 and contains a polymer electrolyte; a second solid electrolyte layer 24e that contacts the first solid electrolyte layer 24d and contains a ceramic conductor; and a second liquid electrolyte layer 24b that contacts the second solid electrolyte layer 24e.

Figure 2G:
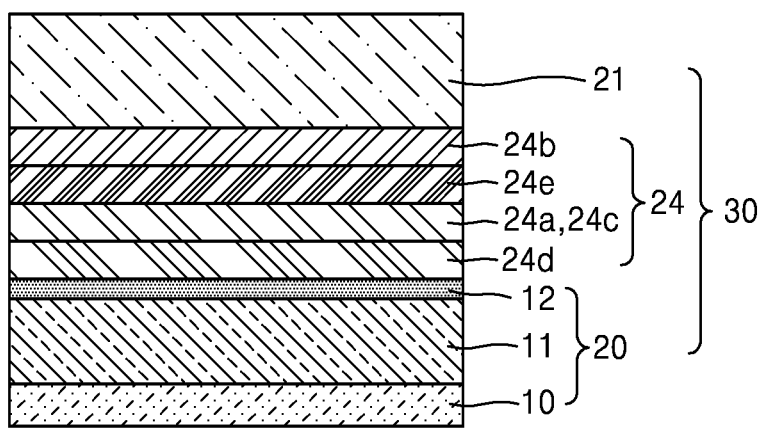

Referring to FIG. 2G, the electrolyte 24 may have a multi-layer structure including a first solid electrolyte layer 24d that contacts the inorganic protection layer 12 of the anode 20 and contains a polymer electrolyte; a separator 24c and a first liquid electrolyte layer 24a, wherein the separator 24c contacts the first solid electrolyte layer 24d, and the first liquid electrolyte layer 24a includes a first liquid electrolyte impregnated in the separator 24c; a second solid electrolyte layer 24e that contacts the first liquid electrolyte layer 24a and contains a ceramic conductor; and a second liquid electrolyte layer 24b that contacts the second solid electrolyte layer 24e. Compositions of the first liquid electrolyte and the second liquid electrolyte may be identical to or different from each other.

Figure 2H:
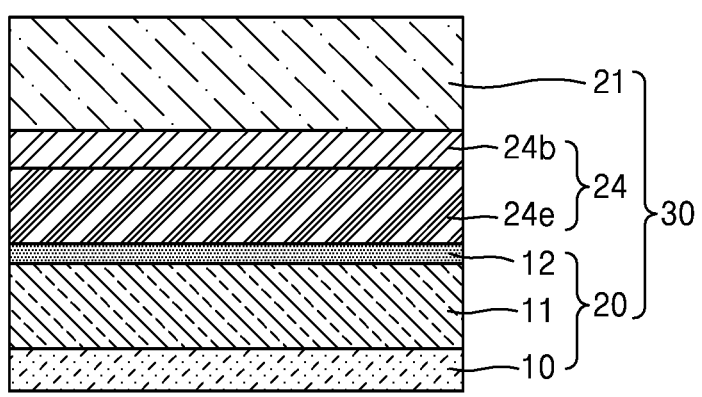

Referring to FIG. 2H, the electrolyte 24 may have a multi-layer structure including a second solid electrolyte layer 24e that contacts the inorganic protection layer 12 of the anode 20 and contains a ceramic conductor; and a second liquid electrolyte layer 24b that contacts the second solid electrolyte layer 24e.

According to an embodiment, a method of preparing an anode includes disposing a first anode layer on a current collector; disposing a second anode layer having an oxidation/reduction potential that is different from that of the first anode layer on the first anode layer; and disposing an inorganic protection layer on the second anode layer. The inorganic protection layer is disposed by atomic layer deposition ("ALD") to a thickness of about 100 nm or less.

Figure 3A:
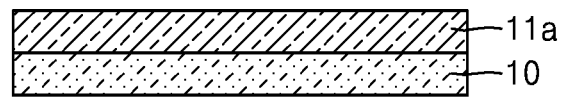
FIGS. 3A to 3C are schematic cross-sectional views of an embodiment of a method of preparing an anode.
Figure 3B:
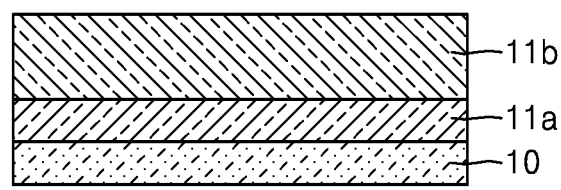
Figure 3C:
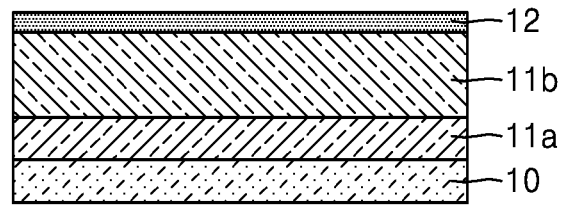

Referring to FIGS. 3A to 3C, the method includes disposing a first anode layer 11a on a current collector 10; disposing a second anode layer 11b having an oxidation/reduction potential that is different from that of the first anode layer 11a on the first anode layer 11a; and disposing an inorganic protection layer 12 on the second anode layer 11b, and the inorganic protection layer 12 is disposed at a thickness of about 100 nm or less by ALD. When the inorganic protection layer 12 is disposed by ALD, the inorganic protection layer 12 substantially produces a protection layer free of pin-hole and/or a grain boundary.

Referring to FIG. 3A, the first anode layer 11a on the current collector 10 includes an anode active material of a lithium transition metal oxide, a transition metal oxide, a non-transition metal oxide, or a combination thereof, and the first anode layer 11a may be disposed by coating, sputtering, chemical vapor deposition, physical vapor deposition, or ALD so that a thickness of the first anode layer 11a is about 100 μm or less. However, a method of preparing the first anode layer 11a is not limited thereto, and any suitable method that forms an anode active material layer in the art may be used to prepare the first anode layer 11a.

Referring to FIG. 3B, the second anode layer 11b is disposed on the first anode layer 11a by plating so that the second anode layer 11b includes lithium metal and has a density of about 5 g/cm³ or less and a thickness of about 1,000 μm or less. Conditions for the plating are not particularly limited and may be those capable of forming a lithium metal layer having a density of about 5 g/cm³ or less. A thickness of the second anode layer 11b may be controlled according to a lithium concentration in a plating solution, a current amount, and/or a plating time.

Referring to FIG. 3C, the inorganic protection layer 12 may be disposed on the second anode layer 11b by ALD. A thickness of the inorganic protection layer 12 may be controlled according to conditions under which the ALD is performed. The deposition conditions of the inorganic protection layer 12 may be controlled within ranges that do not produce pin-holes.

For example, the lithium battery may be prepared as follows.

First, an anode including a current collector, a first anode layer, a second anode layer, and an inorganic protection layer is prepared.

The current collector may be stainless steel, copper, nickel, iron, or cobalt, but the current collector is not limited thereto, and any suitable metallic substrate having desirable conductivity in the art may be used. For example, the current collector may be a conductive oxide substrate or a conductive polymer substrate. Also, the current collector may have various structures such as one surface of an insulating substrate coated with a conductive metal, a conductive metal oxide, or a conductive polymer as well as a whole substrate formed of a conductive material. In an embodiment, the current collector is a flexible substrate. Thus, the current collector may be bent relatively easily. Also, after current collector is bent, the current collector may be restored to its original shape relatively easily.

The first anode layer may be prepared by using a wet method or a dry method.

The first anode layer prepared by using a wet method may be, for example, prepared as follows.

For example, an anode active material, a conducting agent, a binder, and a solvent are mixed to prepare an anode active material composition. In some embodiments, the anode active material composition may be directly coated and dried on a copper current collector to prepare an anode plate having a first anode layer. In some embodiments, the anode cathode active material composition may be cast on a separate support to form an anode active material film, which may then be separated from the support and laminated on a copper current collector to prepare an anode plate having a first anode layer. In some embodiments, the anode active material composition is coated on a copper current collector by spin-coating, bar-coating, or screen-coating. A method of coating a copper current collector with the anode active material composition is not limited thereto, and any suitable method of coating an anode active material composition in the art may be used. The anode active material composition may be referred to as a solution, an ink, or a slurry, depending on a viscosity of the anode active material composition, and an appropriate method of coating the anode active material composition may be selected depending on the viscosity.

The anode active material in the first anode layer may be a lithium transition metal oxide, a transition metal oxide, or a non-transition metal oxide. The anode active material in the first anode layer may be, for example, a lithium titanium oxide represented by Formula 1. In particular, the anode active material in the first anode layer may be Li$_4$Ti$_5$O$_{12}$ having a spinel crystal structure.

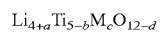

$$Li_{4+a}Ti_{5-b}M_cO_{12-d}$$      Formula 1

In Formula 1, −0.2≤a≤0.2, −0.3≤b≤0.3, and 0≤c≤0.3; and −0.3≤d≤0.3; and M is at least one metal of Group 1 to 6, 8, and 12 to 15.

Examples of the conducting agent may include natural graphite, artificial graphite, carbon black, acetylene black, or Ketjen black; carbon fibers; or a metal powder or metal fibers of copper, nickel, aluminum, or silver. Also, a conducting material such as a polyphenylene derivative or a mixture including a conducting material may be used, but examples of the conducting material are not limited thereto, and any suitable material available as a conducting material in the art may be used.

Examples of the binder may include a vinylidene fluoride/hexafluoropropylene copolymer, polyvinylidene fluoride ("PVDF"), polyacrylonitrile, polymethyl methacrylate, polytetrafluoroethylene, and mixtures thereof, and a styrene-butadiene rubber polymer may be further used as a binder, but examples of the binder are not limited thereto, and any suitable material available as a binder in the art may be used.

Examples of the solvent may include N-methylpyrrolidone, acetone, and water, but examples of the solvent are not limited thereto, and any suitable material available as a solvent in the art may be used.

The amounts of the anode active material, the conducting agent, the binder, and the solvent may be in ranges commonly used in lithium batteries. At least one of the conducting agent, the binder, and the solvent may be omitted according to a use and a structure of the lithium battery.

Examples of the dry method for preparing the first anode layer may include sputtering, chemical vapor deposition, physical vapor deposition, or atomic layer deposition. However, the dry method is not limited thereto, and any suitable method of forming an anode active material in the art may be used.

The second anode layer may be prepared by plating.

For example, the second anode layer containing lithium metal prepared by using a plating method may be prepared as follows.

An anode substrate having a first anode layer on a current collector is impregnated in an electrolytic bath in which a lithium ion is dissolved, and a current is allowed to flow therethrough. In this regard, a lithium metal layer that constitutes a second anode layer is plated on the first anode layer. A density of the lithium metal layer thus formed is about 5 g/cm$^3$ or less.

In some embodiments, the second anode layer further includes an anode active material in addition to lithium. For example, the second anode layer may be an alloy of lithium metal and another anode active material, a composite of lithium metal and another anode active material, and a mixture of lithium metal and another anode active material.

The other anode active material further included in the anode including lithium metal may be, for example, a metal alloyable with lithium.

Examples of the metal alloyable with lithium are Si, Sn, Al, Ge, Pb, Bi, Sb, a Si—Y' alloy (where Y' is an alkali metal, an alkali earth metal, a Group 13 element, a Group 14 element, a transition metal, a rare earth element, or a combination thereof, and Y' is not Si), and a Sn—Y' alloy (where Y' is an alkali metal, an alkali earth metal, a Group 13 element, a Group 14 element, a transition metal, a rare earth element, or a combination thereof, and Y' is not Sn). In some embodiments, Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The inorganic protection layer is prepared by atomic layer deposition ("ALD").

An anode substrate having a second anode layer is placed in a chamber, and an inorganic protection layer is formed on the second anode layer. The inorganic protection layer may include, for example, alumina ($Al_2O_3$), silica ($SiO_2$), titania ($TiO_2$), $HfO_2$, $SrTiO_3$, $SnO_2$, $CeO_2$, $Na_2O$, MgO, NiO, CaO, BaO, ZnO, $ZrO_2$, $Y_2O_3$, $BaTiO_3$, $Li_2O$, RaO, CaO, SrO, $Sc_2O_3$, $Ce_2O_3$, and silsesquioxane having a cage structure; a metal nitride of ZrN, TaN, HfN, VN, NbN, $Cr_2N$, TaN, CrN, GeN, $TLi_3N$, $Mg_3N_2$, $Ca_3N_2$, $Sr_3N_2$, $Ba_3N_2$, BN, AlN, or TiN; a metal nitrate of tantalum oxynitride (TaON), a zirconium oxynitride ($ZrO_xN_y$, where $0<x<2$ and $0<y<3$), and lithium phosphorus oxynitride (LiPON); a metal carbide of TiC, ZrC, HfC, NbC, TaC, $Cr_3C_2$, $Mo_2C$, WC, or SiC; or a metal-organic framework ("MOF").

For example, the inorganic protection layer including alumina may be prepared by providing an aluminum gas on the second anode layer to form an aluminum atomic layer, providing an oxygen gas, and oxidizing aluminum to form an alumina monomolecular layer. This alumina monomolecular layer formation process may be repeated to prepare an alumina inorganic protection layer having a thickness of about 100 nm or less and no pin-hole and/or no grain boundary.

Next, a cathode is prepared.

For example, a cathode active material, a conducting agent, a binder, and a solvent are mixed to prepare a cathode active material composition. In some embodiments, the cathode active material composition may be directly coated and dried on an aluminum current collector to prepare a cathode plate. In some embodiments, the cathode active material composition may be cast on a separate support to form a cathode active material film, which may then be separated from the support and laminated on an aluminum current collector to prepare a cathode plate.

The cathode active material may be any suitable one available in the art, for example, may be a lithium-containing metal oxide. In some embodiments, the cathode active material may be at least one of a composite oxide of lithium with a metal of Co, Mn, Ni, or a combination thereof. In some embodiments, the cathode active material may be a compound represented by one of the following formulae: $Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof In some embodiments, the cathode active material may be $Li_aNi_bCo_cMn_dO_2$ (where $0.90 \leq a \leq 1.8$, $0 \leq b \leq 0.9$, $0.9$, $0 \leq c \leq 0.5$, and $0 \leq d \leq 0.5$), $Li_2MnO_3$, $LiMO_2$ (where M is Mn, Fe, Co, or Ni), $Li_aNibCo_cAl_dO_2$ (where $0.90 \leq a \leq 1.8$, $0 \leq b \leq 0.9$, $0 \leq c \leq 0.5$, and $0 \leq d \leq 0.5$), $LiCoO_2$, $LiMn_xO_{2x}$ (where x=1 or 2), $LiNi_{1-x}Mn_xO_{2x}$ (where $0 < x < 1$), or $LiFePO_4$.

The compounds listed above as cathode active materials may have a surface coating layer (hereinafter, also referred to as "coating layer"). In an embodiment, a mixture of a compound without a coating layer and a compound having a coating layer, the compounds including the compounds listed above, may be used. In some embodiments, the coating layer may include at least one compound of a coating element of an oxide, a hydroxide, an oxyhydroxide, an oxycarbonate, and a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the cathode active material when a compound of the coating element is used. For example, the coating layer may be formed using a spray coating method, or a dipping method. The coating methods may be well understood by one of ordinary skill in the art, and thus a detailed description thereof will be omitted.

Examples of the conducting agent may include natural graphite, artificial graphite, carbon black, acetylene black, or Ketjen black; carbon fibers; or a metal powder or metal fibers of copper, nickel, aluminum, or silver. Also, a conducting material such as a polyphenylene derivative or a mixture including a conducting material may be used, but examples of the conducting material are not limited thereto, and any suitable material available as a conducting material in the art may be used.

Examples of the binder may include a vinylidene fluoride/hexafluoropropylene copolymer, polyvinylidene fluoride ("PVDF"), polyacrylonitrile, polymethyl methacrylate, polytetrafluoroethylene, and mixtures thereof, and a styrene-butadiene rubber polymer may be further used as a binder, but examples of the binder are not limited thereto, and any suitable material available as a binder in the art may be used.

Examples of the solvent are N-methyl-pyrrolidone, acetone, and water, but embodiments are not limited thereto. Any suitable material available as a solvent in the art may be used.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

Next, a separator to be disposed between the cathode and the anode is prepared.

The separator for the lithium battery may be any suitable separator that is commonly used in lithium batteries. In some embodiments, the separator may have relatively low resistance to migration of ions in an electrolyte and have a desirable electrolyte-retaining ability. Examples of the separator are glass fiber, polyester, Teflon, polyethylene, polypropylene, polytetrafluoroethylene ("PTFE"), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any suitable material that is commonly used as a binder for electrode plates. Examples of the polymer resin are a vinylidenefluoride/hexafluoropropylene copolymer, polyvinylidene fluoride ("PVDF"), polyacrylonitrile, polymethylmethacrylate, and a mixture thereof.

Then, an electrolyte is prepared.

In some embodiments, the electrolyte may be an organic electrolyte solution. In some embodiments, the organic electrolyte solution may be prepared by dissolving a lithium salt in an organic solvent.

The organic solvent may be any suitable solvent available as an organic solvent in the art. In some embodiments, the organic solvent may be propylene carbonate, ethylene carbonate, fluoroethylene carbonate, vinylethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, succinonitrile, diethyl glycol dimethyl ether, tetraethylene glycol dimethyl ether, triethyl glycol dimethyl ether, polyethyl glycol dimethyl ether, ethylpropyl carbonate, dipropyl carbonate, dibutyl carbonate, diethylene glycol, dimethyl ether, or a mixture thereof.

In some embodiments, the lithium salt may be any suitable material available as a lithium salt in the art. In some embodiments, the lithium salt may be $LiPF_6$, $LiBF_4$, $LiSbF_6$, $LiAsF_6$, $LiCF_3SO_3$, $Li(CF_3SO_2)_2N$, $Li(FSO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Figure 4:
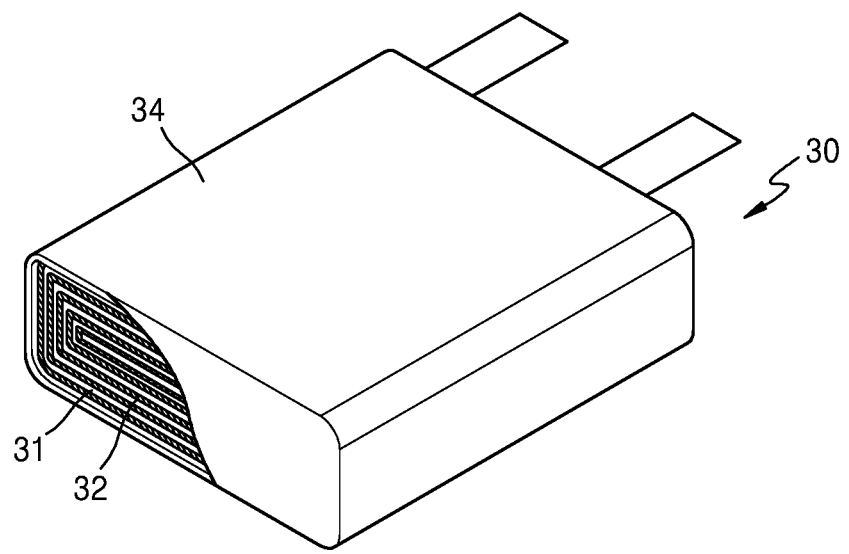
FIG. 4 is a schematic perspective view of an embodiment of a lithium battery.

Referring to FIG. 4, a lithium battery 30 includes a cathode 31; an anode 32; and a battery case 34 that contains the cathode 31 and the anode 32. In some embodiments, the cathode 31, the anode 32, and a separator may be wound or folded, and then sealed in the battery case 34. In some embodiments, the battery case 34 may be filled with an organic electrolytic solution and sealed, thereby completing the manufacture of the lithium battery 30. In some embodiments, the battery case 34 may be a cylindrical type, a rectangular type, or a thin-film type. Although the battery case 34 is shown as a rectangular type in FIG. 6, the battery case 34 may be a flexible pouch type. Accordingly, the battery case 34 may be bent or stretched.

The cathode 31 may be, for example, a porous cathode. The porous cathode may include a cathode having pores or a cathode to which a liquid electrolyte may be permeated into the cathode by a capillary phenomenon as formation of a pore is not intentionally excluded. For example, the porous cathode may include a cathode obtained by coating and drying a cathode active material composition including a cathode active material, a conducting agent, a binder, and a solvent. The cathode contains pores between cathode active material particles. The liquid electrolyte is impregnated in the porous cathode by a capillary phenomenon.

For example, the cathode 31 may include a liquid electrolyte, a gel electrolyte, or a solid electrolyte. The liquid electrolyte, gel electrolyte, and solid electrolyte may be materials that may be used as an electrolyte of a lithium battery in the art and that does not deteriorate a cathode active material by reacting with the cathode active material during a charging/discharging process.

In some embodiments, a battery module including a lithium battery may be formed, a plurality of the lithium batteries or battery modules may be stacked to form a battery pack, which may be used in any suitable device that for which high, e.g., large, capacity and high output is desirable, for example, a laptop computer, a smart phone, or an electric vehicle ("EV").

The lithium battery is not particularly limited to a lithium ion battery or a lithium polymer battery, and examples of the lithium battery may include a lithium air battery or a lithium all-solid battery. Since a lithium battery includes lithium metal, an example of the lithium battery may be a lithium metal battery.

Hereinafter, embodiments will be described in more detail with reference to Examples and Comparative Examples. However, these Examples are provided for illustrative purposes only, and the scope of the embodiments is not intended to be limited by these Examples.

EXAMPLES

Preparation of Anode

Example 1: LTO/Li/Alumina Atomic Layer Deposition ("ALD") Anode

Preparation of Anode

A $Li_4Ti_5O_{12}$ ("LTO") layer, as a first anode layer, was deposited on a copper current collector having a thickness of 20 micrometers (μm) by sputtering to prepare an anode substrate. A thickness of the first anode layer was 1 μm.

The anode substrate having the first anode layer on the current collector was impregnated in an electrolytic bath in which a lithium ion is dissolved, and a current was allowed to flow therethrough. A second anode layer formed of lithium metal was plated on the first anode layer. A thickness of the second anode layer was 10 μm. A density of the second anode layer was 4.5 grams per cubic centimeter (g/cm$^3$).

An alumina layer, as an inorganic protection layer, was deposited on the second anode layer by atomic layer deposition ("ALD"). A thickness of the alumina layer was 10 nanometers (nm).

As a result, an anode plate having a thickness of 31 μm was prepared.

Preparation of Cathode

A $LiNi_{1/3}Co_{1/3}Mn_{1/3}O_2$ composite cathode active material, a carbon conducting material (Denka Black), and polyvinylidene fluoride ("PVDF") were mixed at a weight ratio of 92:4:4 to prepare a mixture. The mixture was mixed with N-methylpyrrolidone ("NMP") in an agate mortar to prepare a slurry. The slurry was coated on an aluminum current collector having a thickness of 15 μm by bar coating, dried at room temperature, dried again in vacuum at 120° C., and then pressed and punched to prepare a cathode plate having a thickness of 55 μm.

Preparation of Pouch Cell

A polyethylene separator (having a porosity of about 48%) was placed between the cathode and the anode to prepare a lithium battery in a shape of a pouch cell.

A liquid electrolyte was injected between the cathode and the anode. As the liquid electrolyte, an electrolyte solution was prepared by dissolving 1.0 M $LiN(SO_2F)_2$ (hereinafter, also referred to as "LiFSI") was dissolved in a solvent mixture including 1,2-dimethoxyethane ("DME") and 1,1,2,2-tetrafluoroethyl 2,2,3,3-tetrafluoropropyl ether ("TTE") at a volume ratio of 2:8.

Example 2: LTO/Li/Alumina (Sputtering) Anode

An anode and a pouch cell were prepared in the same manner as in Example 1, except that a sputtering method was used instead of the atomic layer disposition ("ALD") method to deposit an alumina layer on the second anode layer.

Comparative Example 1: Li/Alumina ALD Anode

An anode including a second anode layer and an inorganic protection layer; and a pouch cell were prepared in the same manner as in Example 1, except that the first anode layer was not formed.

Comparative Example 2: LTO/Li Anode

An anode including a first anode layer and a second anode layer; and a pouch cell were prepared in the same manner as in Example 1, except that the inorganic protection layer was not formed.

Evaluation Example 1: Evaluation of Charge/Discharge Characteristics of Pouch Cell The lithium batteries prepared in Examples 1 and 2 and Comparative Examples 1 and 2 were each charged with a constant current at a 0.1 C rate until a voltage was 4.40 volts (V) (vs. Li). Subsequently, the current was cut-off at 0.05 C rate while a voltage was maintained at 4.40 V in a constant voltage mode. Then, the battery was discharged with a constant current of 0.1 C rate until a voltage was 2.8 V (vs. Li) (formation process, 1st cycle).

Thereafter, the battery was charged with a constant current at 0.2 C rate until a voltage was 4.40 V (vs. Li), and the current was cut-off at 0.05 C rate while a voltage was maintained at 4.40 V in a constant voltage mode. Then, the battery was discharged with a constant current of 0.2 C rate until a voltage was 2.8 V (vs. Li) (formation process, $2^{nd}$ cycle).

At room temperature (25° C.), the lithium secondary battery underwent the formation process was charged with a constant current of 0.5 C until a voltage was 4.4 V vs. Li, and then the battery was discharged with a constant current of 0.5 C until a voltage reached a cut-off voltage of 2.8 V.

This charge/discharge process was repeated until a lithium anode of the second anode layer was completely consumed.

A capacity retention ratio at a point when the lithium anode was completely consumed (at the $N^{th}$ cycle) was calculated according to Equation 1.

Capacity retention ratio at $N^{th}$ cycle (%)=[Discharge capacity at $N^{th}$ cycle/discharge capacity at $1^{st}$ cycle]×100%     Equation 1

As a result of the measurement, capacity retention ratios of the pouch cells prepared in Examples 1 and 2 improved than those of the pouch cells prepared in Comparative Examples 1 and 2. Also, the capacity retention ratio of the pouch cell of Example 1 improved compared to that of the pouch cell of Example 2.

Since the pouch cell of Comparative Example 1 did not have a first anode layer, the second anode layer or the lithium metal was completely consumed as the charge/ discharge repeated, and thus the capacity retention ratio sharply decreased at the point when the lithium anode was completely consumed.

Since the pouch cell of Comparative Example 2 did not have an inorganic protection layer, a side reaction at a surface of the lithium metal of the second anode layer rapidly proceeded as the charge/discharge repeated, and thus the capacity retention ratio further sharply decreased compared to that of the pouch cell of Comparative Example 1.

Since the pouch cells of Examples 1 and 2 include the first anode layer and the inorganic protection layer, LTO, as a first anode layer, existed even after the lithium metal layer, as a second anode layer, is completely consumed. Also, the inorganic protection layer suppresses a side reaction with an electrolyte solution, and thus capacity retention ratios of the pouch cells of Examples 1 and 2 improved compared to those of the pouch cells of Comparative Examples 1 and 2.

Also, the pouch cell of Example 1 included an alumina protection layer free of pin-hole, and thus a capacity retention ratio of the pouch cell of Example 1 improved compared to that of the pouch cell of Example 2 that had an alumina protection layer including a pin-hole.

As described above, according to one or more embodiments, when a lithium battery includes a plurality of anode layers, another anode layer may remain after one anode layer is completely consumed, and thus lifespan characteristics of the lithium battery may improve.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium battery comprising:
a cathode;
an anode comprising
a current collector,
a first anode layer disposed on the current collector,
a second anode layer disposed on the first anode layer, and
an inorganic protection layer disposed on the second anode layer,
wherein the first anode layer is between the current collector and the second anode layer,
wherein the second anode layer comprises lithium metal or a lithium metal alloy and is between the first anode layer and the inorganic protection layer,
wherein an oxidation/reduction potential of the first anode layer and an oxidation/reduction potential of the second anode layer are different from each other,
wherein a thickness of the first anode layer is less than a thickness of the second anode layer; and
an electrolyte between the cathode and the anode,
wherein the thickness of the first anode layer is about 100 nanometers to about 2 micrometers, and the thickness of the second anode layer is about 1 micron to about 100 microns; and
wherein the first anode layer comprises a lithium titanium oxide represented by Formula 1:

Formula 1 wherein, in Formula 1, $-0.2<a<0.2$, $-0.3<b<0.3$, $0<c<0.3$, and $-0.3<d<0.3$; and M is at least one metal of Group 1 to 6, 8, and 12 to 15.

2. The lithium battery of claim 1, wherein the first anode layer is a non-consumable anode layer having an oxidation/reduction potential greater than that of the second anode layer, wherein a thickness of the first anode layer is independent of the number of charge/discharge cycles.

3. The lithium battery of claim 1, wherein the first anode layer comprises a compound having a spinel crystal structure.

4. The lithium battery of claim 1, wherein the second anode layer is a consumable anode layer, wherein a thickness of the second anode layer is dependent on the number of charge/discharge cycles.

5. The lithium battery of claim 1, wherein a density of the lithium metal or the lithium alloy is about 0.5 grams per cubic centimeter or less.

6. The lithium battery of claim 1, wherein the inorganic protection layer is a solvent-impermeable layer substantially free of a pin-hole or a grain boundary.

7. The lithium battery of claim 1, wherein the inorganic protection layer comprises a metal oxide, a metal nitride, a metal nitrate, a metal carbide, a lithiated compound thereof, or a combination thereof; or a ceramic electrolyte.

8. The lithium battery of claim 1, wherein the inorganic protection layer comprises
alumina, silica, titania, $HfO_2$, $SrTiO_3$, $SnO_2$, $CeO_2$, $Na_2O$, MgO, NiO, CaO, BaO, ZnO, $ZrO_2$, $Y_2O_3$, $BaTiO_3$, $Li_2O$, RaO, CaO, SrO, $Sc_2O_3$, $Ce_2O_3$, or silsesquioxane having a cage structure;
ZrN, TaN, HfN, VN, NbN, $Cr_2N$, TaN, CrN, GeN, $TLi_3N$, $Mg_3N_2$, $Ca_3N_2$, $Sr_3N_2$, $Ba_3N_2$, BN, AlN, or TiN;
tantalum oxynitride, a zirconium oxynitride, or lithium phosphorus oxynitride;
TiC, ZrC, HfC, NbC, TaC, $Cr_3C_2$, $Mo_2C$, WC, or SiC;
a metal-organic framework;
a lithiated compound of any of the above; or
$Li_{1+x+y}Al_xTi_{2-x}Si_yP_{3-y}O_{12}$, where $0<x<2$ and $0\leq y<3$, $BaTiO_3$, $Pb(Zr_xTi_{1-x})O_3$ wherein $0\leq x<1$, $Pb_{1-x}La_xZr_{1-y}Ti_yO_3$ (where $0\leq x<1$ and $0\leq y<1$), $Pb(Mg_3Nb_{2/3})O_3$—$PbTiO_3$, lithium phosphate, a lithium titanium phosphate, a lithium aluminum titanium phosphate, $Li_{1+x+y}(Al_aGa_{1-a})_x(Ti_bGe_{1-b})_{2-x}Si_yP_{3-y}O_{12}$, where in $0\leq x\leq 1$, $0\leq y\leq 1$, $0\leq a<1$, and $0\leq b<1$, a lithium lanthanum titanate, a lithium germanium thiophosphate, a lithium nitride, a silicon sulfur glass, a phosphorus sulfur glass, a $Li_2O$—$Al_2O_3$—$SiO_2$—$P_2O_5$—$TiO_2$—$GeO_2$ ceramic, or a Garnet ceramic.

9. The lithium battery of claim 1, wherein a thickness of the inorganic protection layer is about 100 nanometers or less.

10. The lithium battery of claim 1, wherein the inorganic protection layer is a flexible layer that is bendable.

11. The lithium battery of claim 1, wherein the second anode layer is a lithium metal layer, and the inorganic protection layer is an alumina layer free of a pin-hole.

12. The lithium battery of claim 1, wherein the electrolyte comprises:
a single layer structure comprising a first liquid electrolyte layer in contact with an inorganic protection layer of the anode and comprising a first liquid electrolyte;
a single layer structure comprising a first liquid electrolyte layer in contact with the inorganic protection layer of the anode and comprising a separator and a first liquid electrolyte impregnated in the separator;
a single layer structure comprising a first solid electrolyte layer in contact with the inorganic protection layer of the anode and comprising a polymer electrolyte;

a multi-layer structure comprising a first liquid electrolyte layer in contact with the inorganic protection layer of the anode and comprising a separator and a first liquid electrolyte impregnated in the separator, a second solid electrolyte layer in contact with the first liquid electrolyte layer and comprising a ceramic conductor, and a second liquid electrolyte layer in contact with the second solid electrolyte layer and comprising a second liquid electrolyte;

a multi-layer structure comprising a first solid electrolyte layer in contact with the inorganic protection layer of the anode and comprising a polymer electrolyte, a second solid electrolyte layer in contact with the first solid electrolyte layer and comprising a ceramic conductor, and a second liquid electrolyte layer in contact with the second solid electrolyte layer and comprising a second liquid electrolyte;

a multi-layer structure comprising a first solid electrolyte layer in contact with the inorganic protection layer of the anode and comprising a polymer electrolyte, a first liquid electrolyte layer in contact with the first solid electrolyte layer and comprising a separator and a first liquid electrolyte impregnated in the separator, a second solid electrolyte layer in contact with the first liquid electrolyte layer and comprising a ceramic conductor, and a second liquid electrolyte layer in contact with the second solid electrolyte layer and comprising a second liquid electrolyte; or a multi-layer structure comprising a second solid electrolyte layer in contact with the inorganic protection layer of the anode and comprising a ceramic conductor, and further comprising a second liquid electrolyte layer in contact with the second solid electrolyte layer.

13. A method of preparing an anode, the method comprising:

disposing a first anode layer on a current collector;

disposing, on the first anode layer, a second anode layer having an oxidation/reduction potential different from that of the first anode layer; and disposing an inorganic protection layer on the second anode layer, wherein the inorganic protection layer is disposed by atomic layer deposition to a thickness of about 100 nanometers or less, wherein the first anode layer is between the current collector and the second anode layer, wherein the second anode layer is between the first anode layer and the inorganic protection layer, wherein a thickness of the first anode layer is less than a thickness of the second anode layer, wherein the thickness of the first anode layer is about 100 nanometers to about 2 micrometers, and the thickness of the second anode layer is about 1 micron to about 100 microns; and wherein the first anode layer comprises a lithium titanium oxide represented by $$Li_{4+a}Ti_{5-b}M_cO_{12-d} \quad \text{Formula 1}$$

wherein, in Formula 1, $-0.2<a<0.2$, $-0.3<b<0.3$, $0<c<0.3$, and $-0.3<d<0.3$; and M is at least one metal of Group 1 to 6, 8, and 12 to 15.

14. The method of claim 13, wherein the first anode layer is disposed by coating, sputtering, chemical vapor deposition, physical vapor deposition, or atomic layer deposition, and the second anode layer comprises lithium metal and is disposed by plating such that the second anode layer has a density of about 5 grams per cubic centimeter or less.

15. The lithium battery of claim 1, wherein the second anode layer has a thickness of about 2 microns to about 18 microns.

* * * * *